(12) United States Patent
Bhiravabhatla et al.

(10) Patent No.: US 11,682,109 B2
(45) Date of Patent: Jun. 20, 2023

(54) CONFIGURABLE APRON SUPPORT FOR EXPANDED-BINNING

(71) Applicant: QUALCOMM Incorporated, San Diego, CA (US)

(72) Inventors: Kalyan Kumar Bhiravabhatla, Bengaluru (IN); Krishnaiah Gummidipudi, Bangalore (IN); Ankit Kumar Singh, Bangalore (IN); Andrew Evan Gruber, Arlington, MA (US); Pavan Kumar Akkaraju, Bangalore (IN); Srihari Babu Alla, San Diego, CA (US); Jonnala Gadda Nagendra Kumar, San Diego, CA (US); Vishwanath Shashikant Nikam, Bangalore (IN)

(73) Assignee: QUALCOMM Incorporated, San Diego, CA (US)

( * ) Notice: Subject to any disclaimer, the term of this patent is extended or adjusted under 35 U.S.C. 154(b) by 279 days.

(21) Appl. No.: 17/073,218

(22) Filed: Oct. 16, 2020

(65) Prior Publication Data
US 2022/0122238 A1 Apr. 21, 2022

(51) Int. Cl.
*G06T 5/40* (2006.01)
*G06T 7/13* (2017.01)
*G06T 1/20* (2006.01)
*G06T 5/20* (2006.01)
*G06T 15/00* (2011.01)
*G06T 15/40* (2011.01)

(52) U.S. Cl.
CPC ............. *G06T 5/40* (2013.01); *G06T 1/20* (2013.01); *G06T 5/20* (2013.01); *G06T 7/13* (2017.01); *G06T 15/005* (2013.01); *G06T 15/40* (2013.01)

(58) Field of Classification Search
None
See application file for complete search history.

(56) References Cited

U.S. PATENT DOCUMENTS

| 5,522,082 | A  | * | 5/1996 | Guttag ...................... G06F 9/30 712/34 |
| 9,569,811 | B2 | * | 2/2017 | Gruber .................. G06T 15/005 |
| 2006/0209065 | A1 | * | 9/2006 | Lapidous ................ G06T 15/40 345/422 |
| 2012/0212488 | A1 | * | 8/2012 | Yu .......................... G06T 15/00 345/422 |

(Continued)

OTHER PUBLICATIONS

International Search Report and Written Opinion—PCT/US2021/050670—ISA/EPO—dated Jan. 5, 2022.

*Primary Examiner* — Patrick F Valdez
(74) *Attorney, Agent, or Firm* — Procopio, Cory, Hargreaves & Savtich LLP (57) ABSTRACT

This disclosure provides systems, devices, apparatus, and methods, including computer programs encoded on storage media, for configurable aprons for expanded binning. Aspects of the present disclosure include identifying one or more pixel tiles in at least one bin and determining edge information for each pixel tile of the one or more pixel tiles. The edge information may be associated with one or more pixels adjacent to each pixel tile. The present disclosure further describes determining whether at least one adjacent bin is visible based on the edge information for each pixel tile, where the at least one adjacent bin may be adjacent to the at least one bin.

37 Claims, 7 Drawing Sheets

(56) References Cited

U.S. PATENT DOCUMENTS

| | | | |
|---|---|---|---|
| 2015/0109293 A1* | 4/2015 | Wang | G06T 15/405 |
| | | | 345/422 |
| 2015/0379663 A1 | 12/2015 | Gruber et al. | |
| 2016/0148424 A1 | 5/2016 | Chung et al. | |
| 2018/0189923 A1* | 7/2018 | Zhong | G06T 15/40 |
| 2020/0005505 A1* | 1/2020 | Van Benthem | G06T 7/13 |

* cited by examiner

CONFIGURABLE APRON SUPPORT FOR EXPANDED-BINNING

TECHNICAL FIELD

The present disclosure relates generally to processing systems and, more particularly, to one or more techniques for graphics processing, such as configurable apron support for expanded-binning.

INTRODUCTION

Computing devices often utilize a graphics processing unit (GPU) to accelerate the rendering of graphical data for display. Such computing devices may include, for example, computer workstations, mobile phones such as so-called smartphones, embedded systems, personal computers, tablet computers, and video game consoles. GPUs execute a graphics processing pipeline that includes one or more processing stages that operate together to execute graphics processing commands and output a frame. A central processing unit (CPU) may control the operation of the GPU by issuing one or more graphics processing commands to the GPU. Modern day CPUs are typically capable of concurrently executing multiple applications, each of which may need to utilize the GPU during execution. A device that provides content for visual presentation on a display generally includes a GPU.

Typically, a GPU of a device is configured to perform the processes in a graphics processing pipeline. However, with the advent of wireless communication and smaller, handheld devices, there has developed an increased need for improved graphics processing.

SUMMARY

The following presents a simplified summary of one or more aspects in order to provide a basic understanding of such aspects. This summary is not an extensive overview of all contemplated aspects, and is intended to neither identify key elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The apparatus may be a central processing unit (CPU), a graphics processing unit (GPU), or any apparatus that can perform graphics processing. The apparatus may identify one or more pixel tiles in at least one bin; determine edge information for each pixel tile of the one or more pixel tiles, the edge information being associated with one or more pixels adjacent to each pixel tile; and determine whether at least one adjacent bin is visible based on the edge information for each pixel tile, the at least one adjacent bin being adjacent to the at least one bin. The apparatus may also generate a pixel mask for each pixel tile of the one or more pixel tiles. The apparatus may also determine whether at least one pixel of the one or more pixels is visible based on an application of the pixel mask. The apparatus may also transmit the edge information for each pixel tile from a rasterizer block to a visibility stream recorder block. The apparatus may also determine corner information for each pixel tile of the one or more pixel tiles.

The details of one or more examples of the disclosure are set forth in the accompanying drawings and the description below. Other features, objects, and advantages of the disclosure will be apparent from the description and drawings, and from the claims.

DETAILED DESCRIPTION

In a tiled/bin rendering architecture, a bin may be rendered beyond one or more programmed sides of the bin to provide additional pixels/information for post-rendering operations, such as filtering. That is, a bin expansion mode may be configured to expand the bin such that the bin may overlap with one or more adjacent bins. In some architectures, 16 pixels may be a minimum program size for expanding the bin. Thus, the apron around the bin may be a multiple of 16 pixels and may create inefficiencies in the rendering process, as a fixed apron size may correspond to a high overhead. Accordingly, bin expansion may be based on a configurable apron when the apron regions around the bin have different size specifications. The configurable apron may be based on per pixel programming (e.g., 1 pixel, 2 pixels, N pixels, etc.) to provide a width of the apron that may be adapted for the rendering process with a granularity as small as 1 pixel. An interface may be configured between a pixel rasterization block and a visibility block to determine edge information associated with one or more pixels of an adjacent pixel tile/bin. Based on the edge information, the one or more pixels included in the apron region of the expanded bin may be designated as visible based on the configured size of the apron.

Various aspects of systems, apparatuses, computer program products, and methods are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of this disclosure to those skilled in the art. Based on the teachings herein one skilled in the art should appreciate that the scope of this disclosure is intended to cover any aspect of the systems, apparatuses, computer program products, and methods disclosed herein, whether implemented independently of, or combined with, other aspects of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. Any aspect disclosed herein may be embodied by one or more elements of a claim.

Although various aspects are described herein, many variations and permutations of these aspects fall within the scope of this disclosure. Although some potential benefits and advantages of aspects of this disclosure are mentioned, the scope of this disclosure is not intended to be limited to particular benefits, uses, or objectives. Rather, aspects of this disclosure are intended to be broadly applicable to different wireless technologies, system configurations, networks, and transmission protocols, some of which are illustrated by way of example in the figures and in the following description. The detailed description and drawings are merely illustrative of this disclosure rather than limiting, the scope of this disclosure being defined by the appended claims and equivalents thereof.

Several aspects are presented with reference to various apparatus and methods. These apparatus and methods are described in the following detailed description and illustrated in the accompanying drawings by various blocks, components, circuits, processes, algorithms, and the like (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors (which may also be referred to as processing units). Examples of processors include microprocessors, microcontrollers, graphics processing units (GPUs), general purpose GPUs (GPGPUs), central processing units (CPUs), application processors, digital signal processors (DSPs), reduced instruction set computing (RISC) processors, systems-on-chip (SOC), baseband processors, application specific integrated circuits (ASICs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software can be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise. The term application may refer to software. As described herein, one or more techniques may refer to an application, i.e., software, being configured to perform one or more functions. In such examples, the application may be stored on a memory, e.g., on-chip memory of a processor, system memory, or any other memory. Hardware described herein, such as a processor may be configured to execute the application. For example, the application may be described as including code that, when executed by the hardware, causes the hardware to perform one or more techniques described herein. As an example, the hardware may access the code from a memory and execute the code accessed from the memory to perform one or more techniques described herein. In some examples, components are identified in this disclosure. In such examples, the components may be hardware, software, or a combination thereof. The components may be separate components or sub-components of a single component.

Accordingly, in one or more examples described herein, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

In general, this disclosure describes techniques for having a graphics processing pipeline in a single device or multiple devices, improving the rendering of graphical content, and/or reducing the load of a processing unit, i.e., any processing unit configured to perform one or more techniques described herein, such as a GPU. For example, this disclosure describes techniques for graphics processing in any device that utilizes graphics processing. Other example benefits are described throughout this disclosure.

As used herein, instances of the term "content" may refer to "graphical content," "image," and vice versa. This is true regardless of whether the terms are being used as an adjective, noun, or other parts of speech. In some examples, as used herein, the term "graphical content" may refer to a content produced by one or more processes of a graphics processing pipeline. In some examples, as used herein, the term "graphical content" may refer to a content produced by a processing unit configured to perform graphics processing. In some examples, as used herein, the term "graphical content" may refer to a content produced by a graphics processing unit.

In some examples, as used herein, the term "display content" may refer to content generated by a processing unit configured to perform displaying processing. In some examples, as used herein, the term "display content" may refer to content generated by a display processing unit. Graphical content may be processed to become display content. For example, a graphics processing unit may output graphical content, such as a frame, to a buffer (which may be referred to as a framebuffer). A display processing unit may read the graphical content, such as one or more frames from the buffer, and perform one or more display processing techniques thereon to generate display content. For example, a display processing unit may be configured to perform composition on one or more rendered layers to generate a frame. As another example, a display processing unit may be configured to compose, blend, or otherwise combine two or more layers together into a single frame. A display processing unit may be configured to perform scaling, e.g., upscaling or downscaling, on a frame. In some examples, a frame may refer to a layer. In other examples, a frame may refer to two or more layers that have already been blended together to form the frame, i.e., the frame includes two or more layers, and the frame that includes two or more layers may subsequently be blended.

Figure 1:
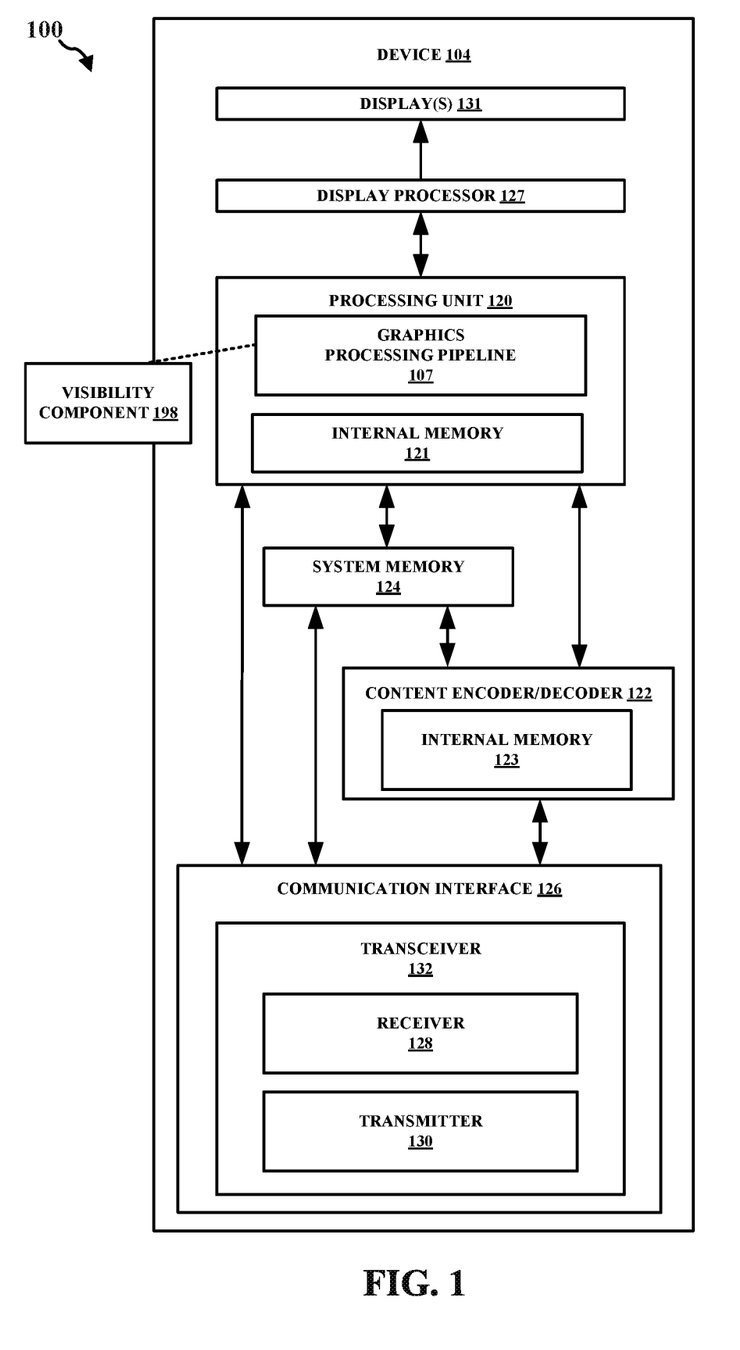
FIG. 1 is a block diagram that illustrates an example content generation system in accordance with one or more techniques of this disclosure.

FIG. 1 is a block diagram that illustrates an example content generation system 100 configured to implement one or more techniques of this disclosure. The content generation system 100 includes a device 104. The device 104 may include one or more components or circuits for performing various functions described herein. In some examples, one or more components of the device 104 may be components of an SOC. The device 104 may include one or more components configured to perform one or more techniques of this disclosure. In the example shown, the device 104 may include a processing unit 120, a content encoder/decoder 122, and a system memory 124. In some aspects, the device 104 can include a number of optional components, e.g., a communication interface 126, a transceiver 132, a receiver 128, a transmitter 130, a display processor 127, and one or more displays 131. Reference to the display 131 may refer to the one or more displays 131. For example, the display 131 may include a single display or multiple displays. The display 131 may include a first display and a second display. The first display may be a left-eye display and the second display may be a right-eye display. In some examples, the first and second display may receive different frames for presentment thereon. In other examples, the first and second display may receive the same frames for presentment thereon. In further examples, the results of the graphics processing may not be displayed on the device, e.g., the first and second display may not receive any frames for presentment thereon. Instead, the frames or graphics processing results may be transferred to another device. In some aspects, this can be referred to as split-rendering.

The processing unit 120 may include an internal memory 121. The processing unit 120 may be configured to perform graphics processing, such as in a graphics processing pipeline 107. The content encoder/decoder 122 may include an internal memory 123. In some examples, the device 104 may include a display processor, such as the display processor 127, to perform one or more display processing techniques on one or more frames generated by the processing unit 120 before presentment by the one or more displays 131. The display processor 127 may be configured to perform display processing. For example, the display processor 127 may be configured to perform one or more display processing techniques on one or more frames generated by the processing unit 120. The one or more displays 131 may be configured to display or otherwise present frames processed by the display processor 127. In some examples, the one or more displays 131 may include one or more of: a liquid crystal display (LCD), a plasma display, an organic light emitting diode (OLED) display, a projection display device, an augmented reality display device, a virtual reality display device, a head-mounted display, or any other type of display device.

Memory external to the processing unit 120 and the content encoder/decoder 122, such as system memory 124, may be accessible to the processing unit 120 and the content encoder/decoder 122. For example, the processing unit 120 and the content encoder/decoder 122 may be configured to read from and/or write to external memory, such as the system memory 124. The processing unit 120 and the content encoder/decoder 122 may be communicatively coupled to the system memory 124 over a bus. In some examples, the processing unit 120 and the content encoder/decoder 122 may be communicatively coupled to each other over the bus or a different connection.

The content encoder/decoder 122 may be configured to receive graphical content from any source, such as the system memory 124 and/or the communication interface 126. The system memory 124 may be configured to store received encoded or decoded graphical content. The content encoder/decoder 122 may be configured to receive encoded or decoded graphical content, e.g., from the system memory 124 and/or the communication interface 126, in the form of encoded pixel data. The content encoder/decoder 122 may be configured to encode or decode any graphical content.

The internal memory 121 or the system memory 124 may include one or more volatile or non-volatile memories or storage devices. In some examples, internal memory 121 or the system memory 124 may include RAM, SRAM, DRAM, erasable programmable ROM (EPROM), electrically erasable programmable ROM (EEPROM), flash memory, a magnetic data media or an optical storage media, or any other type of memory.

The internal memory 121 or the system memory 124 may be a non-transitory storage medium according to some examples. The term "non-transitory" may indicate that the storage medium is not embodied in a carrier wave or a propagated signal. However, the term "non-transitory" should not be interpreted to mean that internal memory 121 or the system memory 124 is non-movable or that its contents are static. As one example, the system memory 124 may be removed from the device 104 and moved to another device. As another example, the system memory 124 may not be removable from the device 104.

The processing unit 120 may be a central processing unit (CPU), a graphics processing unit (GPU), a general purpose GPU (GPGPU), or any other processing unit that may be configured to perform graphics processing. In some examples, the processing unit 120 may be integrated into a motherboard of the device 104. In some examples, the processing unit 120 may be present on a graphics card that is installed in a port in a motherboard of the device 104, or may be otherwise incorporated within a peripheral device configured to interoperate with the device 104. The processing unit 120 may include one or more processors, such as one or more microprocessors, GPUs, application specific integrated circuits (ASICs), field programmable gate arrays (FPGAs), arithmetic logic units (ALUs), digital signal processors (DSPs), discrete logic, software, hardware, firmware, other equivalent integrated or discrete logic circuitry, or any combinations thereof. If the techniques are implemented partially in software, the processing unit 120 may store instructions for the software in a suitable, non-transitory computer-readable storage medium, e.g., internal memory 121, and may execute the instructions in hardware using one or more processors to perform the techniques of this disclosure. Any of the foregoing, including hardware, software, a combination of hardware and software, etc., may be considered to be one or more processors.

The content encoder/decoder 122 may be any processing unit configured to perform content decoding. In some examples, the content encoder/decoder 122 may be integrated into a motherboard of the device 104. The content encoder/decoder 122 may include one or more processors, such as one or more microprocessors, application specific integrated circuits (ASICs), field programmable gate arrays (FPGAs), arithmetic logic units (ALUs), digital signal processors (DSPs), video processors, discrete logic, software, hardware, firmware, other equivalent integrated or discrete logic circuitry, or any combinations thereof. If the techniques are implemented partially in software, the content encoder/decoder 122 may store instructions for the software in a suitable, non-transitory computer-readable storage medium, e.g., internal memory 123, and may execute the instructions in hardware using one or more processors to perform the techniques of this disclosure. Any of the foregoing, including hardware, software, a combination of hardware and software, etc., may be considered to be one or more processors.

In some aspects, the content generation system 100 can include an optional communication interface 126. The communication interface 126 may include a receiver 128 and a transmitter 130. The receiver 128 may be configured to perform any receiving function described herein with respect to the device 104. Additionally, the receiver 128 may be configured to receive information, e.g., eye or head position information, rendering commands, or location information, from another device. The transmitter 130 may be configured to perform any transmitting function described herein with respect to the device 104. For example, the transmitter 130 may be configured to transmit information to another device, which may include a request for content. The receiver 128 and the transmitter 130 may be combined into a transceiver 132. In such examples, the transceiver 132 may be configured to perform any receiving function and/or transmitting function described herein with respect to the device 104.

Referring again to FIG. 1, in certain aspects, the graphics processing pipeline 107 may include a visibility component 198 configured to identify one or more pixel tiles in at least one bin; determine edge information for each pixel tile of the one or more pixel tiles, the edge information being associated with one or more pixels adjacent to each pixel tile; and determine whether at least one adjacent bin is visible based on the edge information for each pixel tile, the at least one adjacent bin being adjacent to the at least one bin.

As described herein, a device, such as the device 104, may refer to any device, apparatus, or system configured to perform one or more techniques described herein. For example, a device may be a server, a base station, user equipment, a client device, a station, an access point, a computer, e.g., a personal computer, a desktop computer, a laptop computer, a tablet computer, a computer workstation, or a mainframe computer, an end product, an apparatus, a phone, a smart phone, a server, a video game platform or console, a handheld device, e.g., a portable video game device or a personal digital assistant (PDA), a wearable computing device, e.g., a smart watch, an augmented reality device, or a virtual reality device, a non-wearable device, a display or display device, a television, a television set-top box, an intermediate network device, a digital media player, a video streaming device, a content streaming device, an in-car computer, any mobile device, any device configured to generate graphical content, or any device configured to perform one or more techniques described herein. Processes herein may be described as performed by a particular component (e.g., a GPU), but, in further embodiments, can be performed using other components (e.g., a CPU), consistent with disclosed embodiments.

GPUs can process multiple types of data or data packets in a GPU pipeline. For instance, in some aspects, a GPU can process two types of data or data packets, e.g., context register packets and draw call data. A context register packet can be a set of global state information, e.g., information regarding a global register, shading program, or constant data, which can regulate how a graphics context will be processed. For example, context register packets can include information regarding a color format. In some aspects of context register packets, there can be a bit that indicates which workload belongs to a context register. Also, there can be multiple functions or programming running at the same time and/or in parallel. For example, functions or programming can describe a certain operation, e.g., the color mode or color format. Accordingly, a context register can define multiple states of a GPU.

Context states can be utilized to determine how an individual processing unit functions, e.g., a vertex fetcher (VFD), a vertex shader (VS), a shader processor, or a geometry processor, and/or in what mode the processing unit functions. In order to do so, GPUs can use context registers and programming data. In some aspects, a GPU can generate a workload, e.g., a vertex or pixel workload, in the pipeline based on the context register definition of a mode or state. Certain processing units, e.g., a VFD, can use these states to determine certain functions, e.g., how a vertex is assembled. As these modes or states can change, GPUs may need to change the corresponding context. Additionally, the workload that corresponds to the mode or state may follow the changing mode or state.

Figure 2:
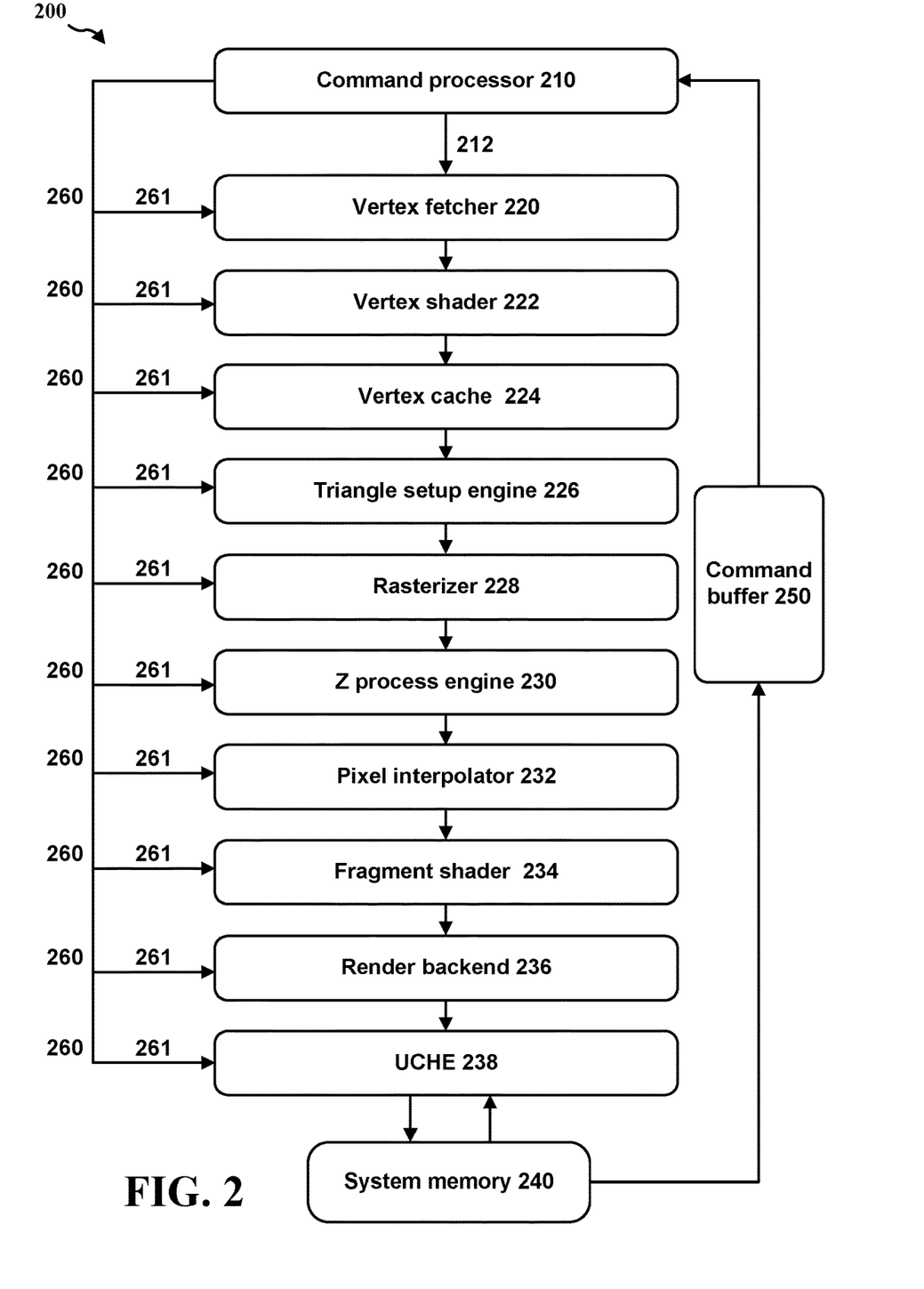
FIG. 2 illustrates an example GPU in accordance with one or more techniques of this disclosure.

FIG. 2 illustrates an example GPU 200 in accordance with one or more techniques of this disclosure. As shown in FIG. 2, GPU 200 includes command processor (CP) 210, draw call packets 212, VFD 220, VS 222, vertex cache (VPC) 224, triangle setup engine (TSE) 226, rasterizer (RAS) 228, Z process engine (ZPE) 230, pixel interpolator (PI) 232, fragment shader (FS) 234, render backend (RB) 236, L2 cache (UCHE) 238, and system memory 240. Although FIG. 2 displays that GPU 200 includes processing units 220-238, GPU 200 can include a number of additional processing units. Additionally, processing units 220-238 are merely an example and any combination or order of processing units can be used by GPUs according to the present disclosure. GPU 200 also includes command buffer 250, context register packets 260, and context states 261.

As shown in FIG. 2, a GPU can utilize a CP, e.g., CP 210, or hardware accelerator to parse a command buffer into context register packets, e.g., context register packets 260, and/or draw call data packets, e.g., draw call packets 212. The CP 210 can then send the context register packets 260 or draw call data packets 212 through separate paths to the processing units or blocks in the GPU. Further, the command buffer 250 can alternate different states of context registers and draw calls. For example, a command buffer can be structured in the following manner: context register of context N, draw call(s) of context N, context register of context N+1, and draw call(s) of context N+1.

GPUs can render images in a variety of different ways. In some instances, GPUs can render an image using rendering or tiled rendering. In tiled rendering GPUs, an image can be divided or separated into different sections or tiles. After the division of the image, each section or tile can be rendered separately. Tiled rendering GPUs can divide computer graphics images into a grid format, such that each portion of the grid, i.e., a tile, is separately rendered. In some aspects, during a binning pass, an image can be divided into different bins or tiles. In some aspects, during the binning pass, a visibility stream can be constructed where visible primitives or draw calls can be identified.

In some aspects, GPUs can apply the drawing or rendering process to different bins or tiles. For instance, a GPU can render to one bin, and perform all the draws for the primitives or pixels in the bin. During the process of rendering to a bin, the render targets can be located in the GMEM. In some instances, after rendering to one bin, the content of the render targets can be moved to a system memory and the GMEM can be freed for rendering the next bin. Additionally, a GPU can render to another bin, and perform the draws for the primitives or pixels in that bin. Therefore, in some aspects, there might be a small number of bins, e.g., four bins, that cover all of the draws in one surface. Further, GPUs can cycle through all of the draws in one bin, but perform the draws for the draw calls that are visible, i.e., draw calls that include visible geometry. In some aspects, a visibility stream can be generated, e.g., in a binning pass, to determine the visibility information of each primitive in an image or scene. For instance, this visibility stream can identify whether a certain primitive is visible or not. In some aspects, this information can be used to remove primitives that are not visible, e.g., in the rendering pass. Also, at least some of the primitives that are identified as visible can be rendered in the rendering pass.

In some aspects of tiled rendering, there can be multiple processing phases or passes. For instance, the rendering can be performed in two passes, e.g., a visibility or bin-visibility pass and a rendering or bin-rendering pass. During a visibility pass, a GPU can input a rendering workload, record the positions of the primitives or triangles, and then determine which primitives or triangles fall into which bin or area. In some aspects of a visibility pass, GPUs can also identify or mark the visibility of each primitive or triangle in a visibility stream. During a rendering pass, a GPU can input the visibility stream and process one bin or area at a time. In some aspects, the visibility stream can be analyzed to determine which primitives, or vertices of primitives, are visible or not visible. As such, the primitives, or vertices of primitives, that are visible may be processed. By doing so, GPUs can reduce the unnecessary workload of processing or rendering primitives or triangles that are not visible.

In some aspects, during a visibility pass, certain types of primitive geometry, e.g., position-only geometry, may be processed. Additionally, depending on the position or location of the primitives or triangles, the primitives may be sorted into different bins or areas. In some instances, sorting primitives or triangles into different bins may be performed by determining visibility information for these primitives or triangles. For example, GPUs may determine or write visibility information of each primitive in each bin or area, e.g., in a system memory. This visibility information can be used to determine or generate a visibility stream. In a rendering pass, the primitives in each bin can be rendered separately. In these instances, the visibility stream can be fetched from memory used to drop primitives which are not visible for that bin.

Some aspects of GPUs or GPU architectures can provide a number of different options for rendering, e.g., software rendering and hardware rendering. In software rendering, a driver or CPU can replicate an entire frame geometry by processing each view one time. Additionally, some different states may be changed depending on the view. As such, in software rendering, the software can replicate the entire workload by changing some states that may be utilized to render for each viewpoint in an image. In certain aspects, as GPUs may be submitting the same workload multiple times for each viewpoint in an image, there may be an increased amount of overhead. In hardware rendering, the hardware or GPU may be responsible for replicating or processing the geometry for each viewpoint in an image. Accordingly, the hardware can manage the replication or processing of the primitives or triangles for each viewpoint in an image.

Figure 3:
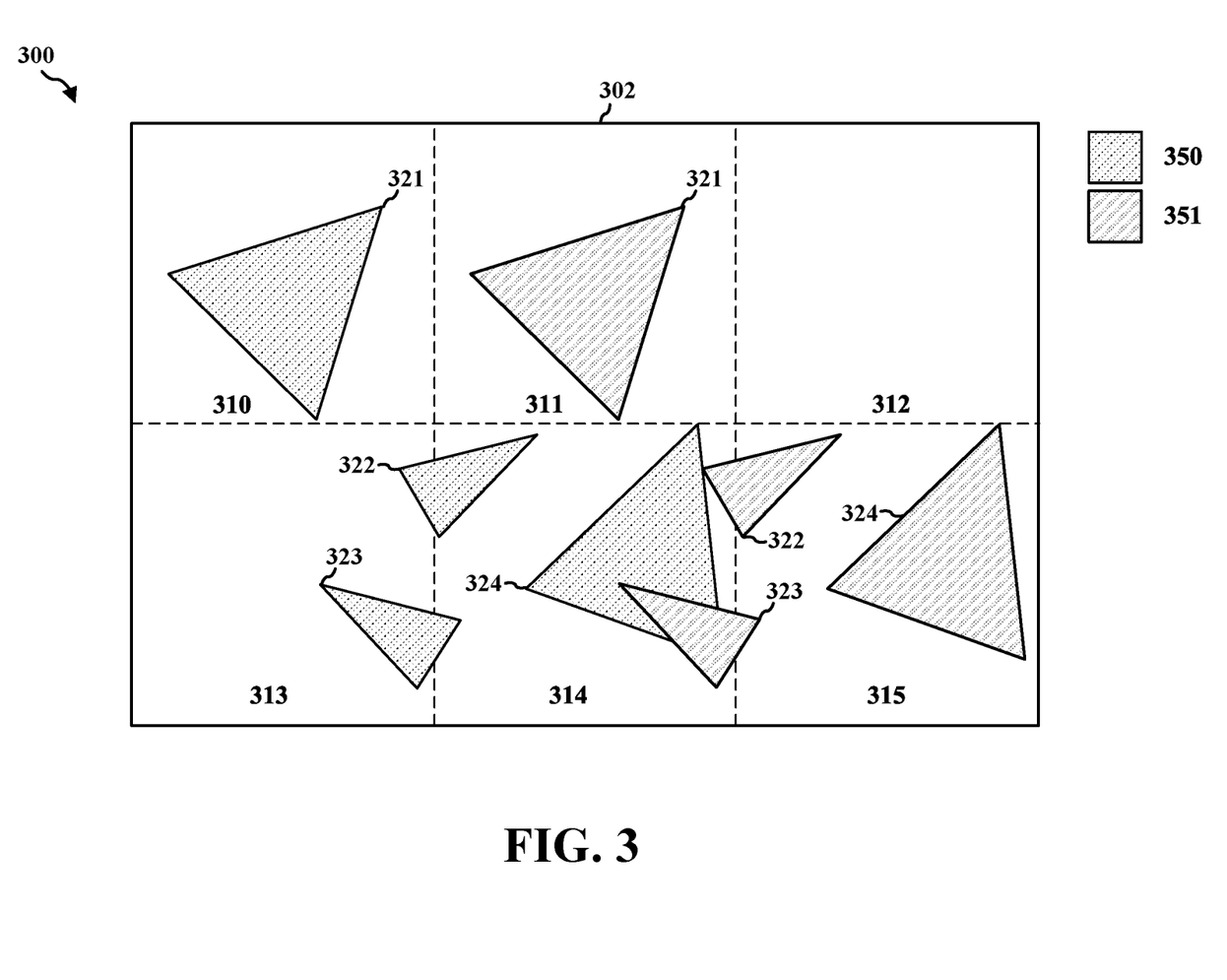
FIG. 3 illustrates an example image or surface in accordance with one or more techniques of this disclosure.

FIG. 3 illustrates image or surface 300, including multiple primitives divided into multiple bins. As shown in FIG. 3, image or surface 300 includes area 302, which includes primitives 321, 322, 323, and 324. The primitives 321, 322, 323, and 324 are divided or placed into different bins, e.g., bins 310, 311, 312, 313, 314, and 315. FIG. 3 illustrates an example of tiled rendering using multiple viewpoints for the primitives 321-324. For instance, primitives 321-324 are in first viewpoint 350 and second viewpoint 351. As such, the GPU processing or rendering the image or surface 300 including area 302 can utilize multiple viewpoints or multi-view rendering.

As indicated herein, GPUs or graphics processor units can use a tiled rendering architecture to reduce power consumption or save memory bandwidth. As further stated above, this rendering method can divide the scene into multiple bins, as well as include a visibility pass that identifies the triangles that are visible in each bin. Thus, in tiled rendering, a full screen can be divided into multiple bins or tiles. The scene can then be rendered multiple times, e.g., one or more times for each bin.

In aspects of graphics rendering, some graphics applications may render to a single target, i.e., a render target, one or more times. For instance, in graphics rendering, a frame buffer on a system memory may be updated multiple times. The frame buffer can be a portion of memory or random access memory (RAM), e.g., containing a bitmap or storage, to help store display data for a GPU. The frame buffer can also be a memory buffer containing a complete frame of data. Additionally, the frame buffer can be a logic buffer. In some aspects, updating the frame buffer can be performed in bin or tile rendering, where, as discussed above, a surface is divided into multiple bins or tiles and then each bin or tile can be separately rendered. Further, in tiled rendering, the frame buffer can be partitioned into multiple bins or tiles.

As indicated herein, in some aspects, such as in bin or tiled rendering architecture, frame buffers can have data stored or written to them repeatedly, e.g., when rendering from different types of memory. This can be referred to as resolving and unresolving the frame buffer or system memory. For example, when storing or writing to one frame buffer and then switching to another frame buffer, the data or information on the frame buffer can be resolved from the GPU internal memory (GMEM) at the GPU to the system memory, i.e., memory in the double data rate (DDR) RAM or dynamic RAM (DRAM).

In some aspects, the system memory can also be system-on-chip (SoC) memory or another chip-based memory to store data or information, e.g., on a device or smart phone. The system memory can also be physical data storage that is shared by the CPU and/or the GPU. In some aspects, the system memory can be a DRAM chip, e.g., on a device or smart phone. Accordingly, SoC memory can be a chip-based manner in which to store data.

In some aspects, the GMEM can be on-chip memory at the GPU, which can be implemented by static RAM (SRAM). Additionally, GMEM can be stored on a device, e.g., a smart phone. As indicated herein, data or information can be transferred between the system memory or DRAM and the GMEM, e.g., at a device. In some aspects, the system memory or DRAM can be at the CPU or GPU. Additionally, data can be stored at the DDR or DRAM. In some aspects, such as in bin or tiled rendering, a small portion of the memory can be stored at the GPU, e.g., at the GMEM. In some instances, storing data at the GMEM may utilize a larger processing workload and/or power consumed compared to storing data at the frame buffer or system memory.

Figure 4:
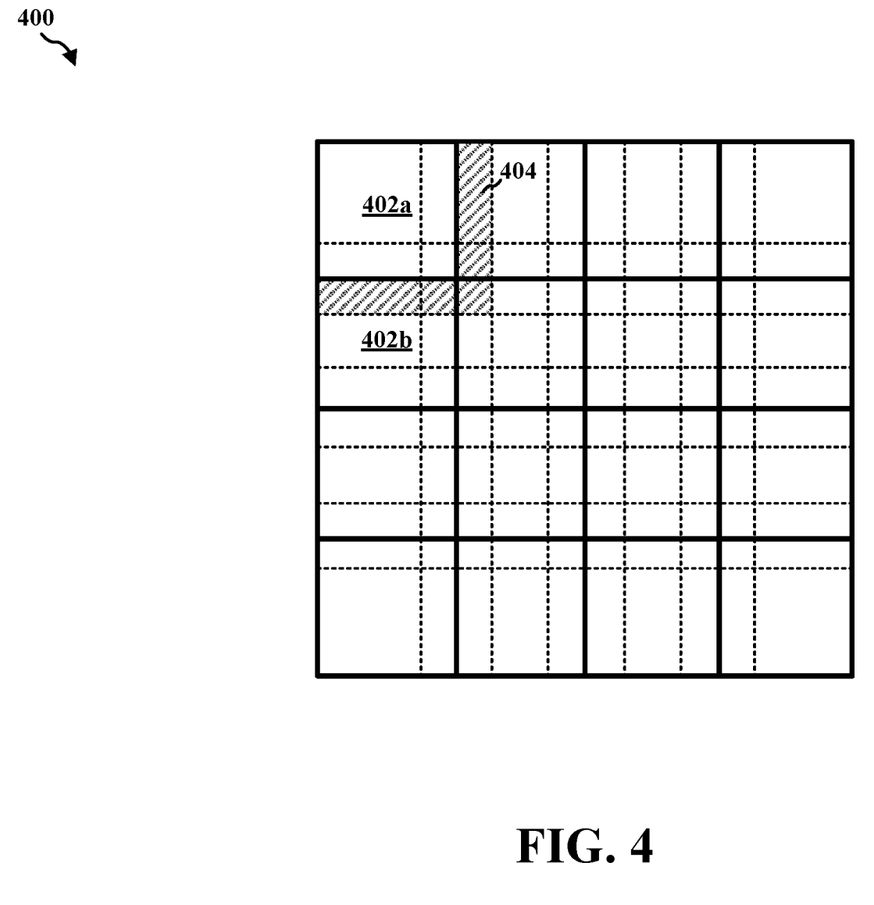
FIG. 4 illustrates a diagram for bin expansion based on a configurable apron.

FIG. 4 illustrates a diagram 400 for bin expansion based on a configurable apron 404. The apron 404 may be configured in association with an overlapping region of two or more bins (e.g., bins 402a-402b). For example, in a tiled/bin rendering architecture, a bin 402a may be rendered beyond one or more programmed sides of the bin 402a to provide additional pixels/information for post-rendering operations, such as filtering. Pixels from neighboring bins, e.g., 402b, may interfere with pixels of a current bin 402a. Thus, a bin expansion mode may be configured to expand the current bin 402a to overlap with the neighboring bins, e.g., 402b. During a binning pass, visibility checking hardware may be used to determine a visibility of incoming tiles across a number of surrounding bins, e.g., 3×3 bins around a center bin.

In some architectures, 16 pixels may be a minimum program size for expanding the bin 402a. That is, bin expansion may correspond to a fixed size of 16 pixels in each direction (e.g., bottom, right, etc.) of the bin 402a. Thus, the apron size may be a multiple of 16 pixels in any direction. The bin 402a may also be associated with both alignment restrictions and hardware restrictions. A 16-pixel bin expansion configuration may be utilized for instances of decreased triangle complexity within a frame, as a focus may be on expanding the pixel region to an outside of the bin 402a and not necessarily on vertex geometry considerations.

For workloads having a 16-pixel expansion in each direction of the bin 402a, the geometry/triangle complexity of the workload may be increased for a binning pass via the 16-pixel apron 404. Due to the increased geometry/triangle complexity, a performance of the binning architecture may be decreased. For example, a course pixel block may be rendered for each of the bins (e.g., 402a, 402b, etc.). If the course pixel block reaches an edge of the bin 402a, the blocks may be expanded and designated as visible for adjacent tiles. The course block of pixels may be 32×16 wide. If the course block of pixels is in a corner of the bin 402a, the block may be designated as visible for all of the tiles that are adjacent to the corner of the bin 402a. For instance, in a bottom right corner of the bin 402a, the three bins that border the corner may be designated as visible. Such designations may generate inefficiencies in the rendering process, as fixed apron sizes may correspond to high overhead.

Even if the expansion is set to 16 pixels, the visibility checking hardware may perform a check at a tile-level granularity such that the expansion region/apron 404 of the bin 402a may be the same as the tile size (e.g., 32×16). Thus, increased inefficiencies may be provided based on apron regions having decreased size specifications. For example, to apply a 2×2 convolution filter on a bin, (Bx+1)*(By+1) pixels may be needed. However, a visibility stream compressor (VSC) block of some architectures may process (Bx+32)*(By+16) pixels. That is, processing a 256×256 bin size may correspond to 20% of the bin area, as opposed to 1% for visibility checks. As a result, a workload of the VSC may be increased by 20% during a render-pass, which may provide decreased performance for processing a 2×2 filter.

In the expanded bin mode, a tile may intersect any of the surrounding bins, e.g., 3×3 bins around the center bin. As such, the hardware may test the intersections with all the bins in a successive manner. The additional intersection checks may be performed over as many as 6 cycles, but may be performed over 1 cycle in a non-expanded bin mode. The additional cycles may cause an increased binning time.

By implementing per pixel programming (e.g., 1 pixel, 2 pixels, N pixels, etc.), a width of the apron 404 of the expanded bin 402a may be adapted for the rendering process. If the expanded bin mode is enabled, the visibility checking hardware may execute a bin expansion algorithm to determine a tile-bin intersection of the expanded bins (e.g., 402a). Accordingly, hardware changes may be implemented to provide a programmable expanded bin 402a with a granularity as small as 1 pixel. An interface may be configured between a pixel rasterization block (e.g., low-resolution z-buffer (LRZ) block) and a visibility block (e.g., VSC block). The visibility block may determine a visibility of the pixels that provide the additional information (e.g., whether the apron 404 is to be one pixel wide (vertically and/or horizontally), whether the pixels correspond to an edge/corner of the tile, etc.). Such information may be provided from the rasterization block to the visibility block and, based on the information, the tiles may be designated as visible for the adjacent tiles, such that the bin 402a may be expanded.

Figure 5:
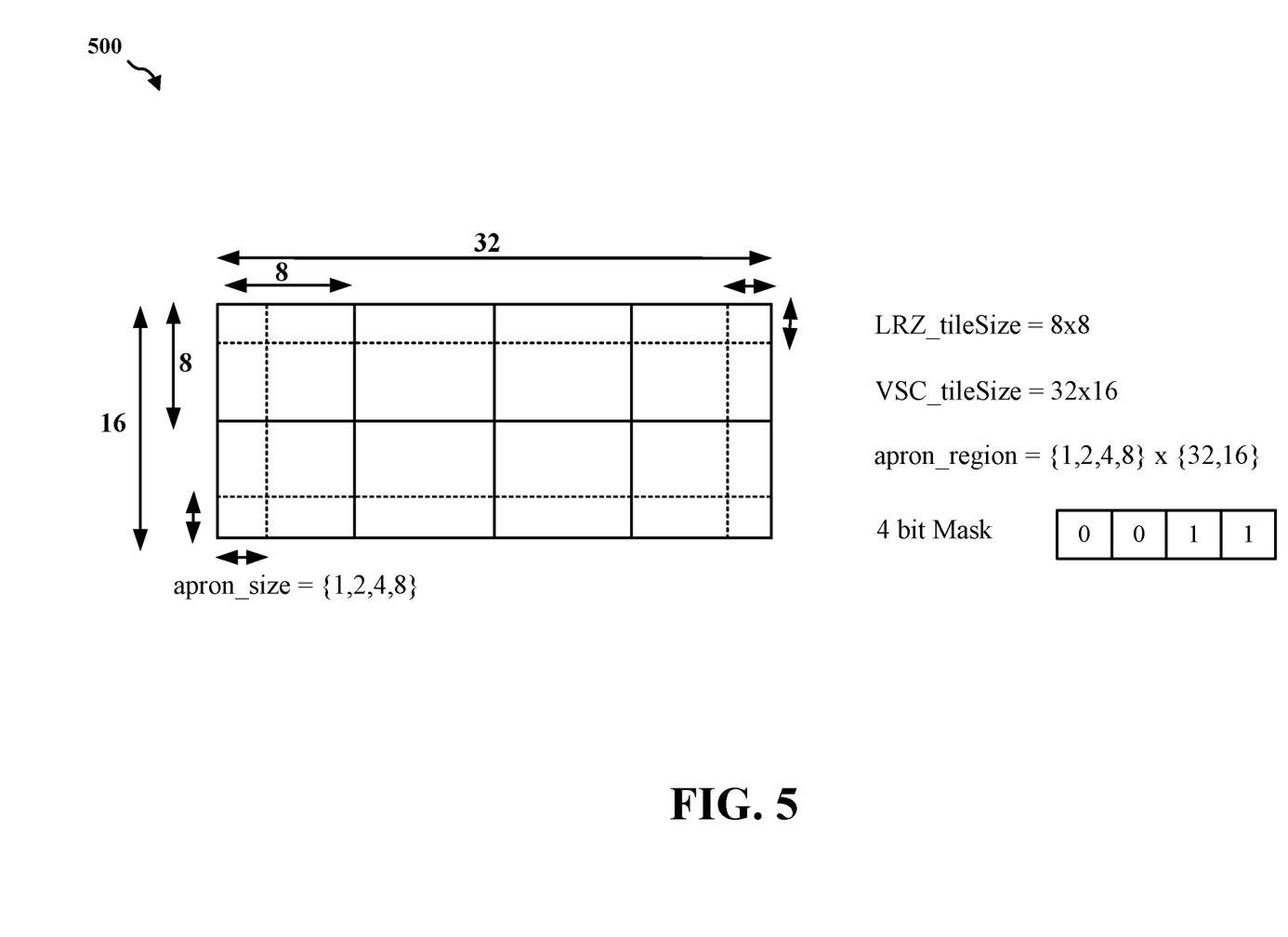
FIG. 5 illustrates a diagram for a configurable apron associated with a visibility mask.

FIG. 5 illustrates a diagram 500 for a configurable apron associated with a visibility mask. A GPU may process 8×8 tiles in a binning pass and determine sample visibility information within each tile. As pipelining the sample visibility information downstream may be associated with a high overhead, the 8×8 tiles may be incorporated in a 32×16 tile without the visibility information and provided for a bin intersection check. Thus, the visibility checking hardware may have a tile size granularity of 32×16 for performing the visibility check.

In examples, the visibility check may be able to occur at a finer granularity. For instance, a user defined state may be associated with the hardware for programing an apron size. The apron region may be programmed to 1, 2, 4, or 8 pixels in some configurations. Further, instead of providing all the visibility information downstream, a 4-bit mask (e.g., 0, 0, 1, 1) may be applied to each 32×16 tile to indicate visibility along a left side, a right side, a top side, and a bottom side of the tile. Each bit may indicate whether the apron region (e.g., left, right: apron_size_y; or top, bottom: apron_size_x) of the tile includes visible pixels.

The apron region may be programmable so that a user or a driver may determine a pixel size of the apron, rather than the apron being based on a course block of pixels. In the rasterizer block (e.g., LRZ block), rows and columns of the edge pixels (e.g., associated with the 32×16 tile) may be identified to determine which edge pixels are delayed based on the programmed width of the pixels/apron size. The edge information may be provided from the rasterizer block to the visibility block to determine an edge of the tile that includes the visible edge pixels. The rasterizer block may be a hierarchical depth block and the visibility block may record a visibility of each tringle based on a bin/tile that includes the triangles. Thus, the rasterizer block may generate the edge information and transmit the edge information to the visibility block.

The visibility block may receive the 32×16 block from the rasterizer block and apply a forward mask. However, any course block size of n×m pixels may be received by the visibility block. For example, the rasterizer block may determine an n×m pixel block and scan the n×m pixel block across a screen to further determine the pixels that are visible in a triangle. That is, the rasterizer block may determine whether the n×m pixel block is located within the triangle/visible area of the screen. The n×m pixel block may be implementation dependent. In examples, a size of the n×m pixel block may be 32×16, 32×32, 16×16, 64×64, etc.

Figure 6:
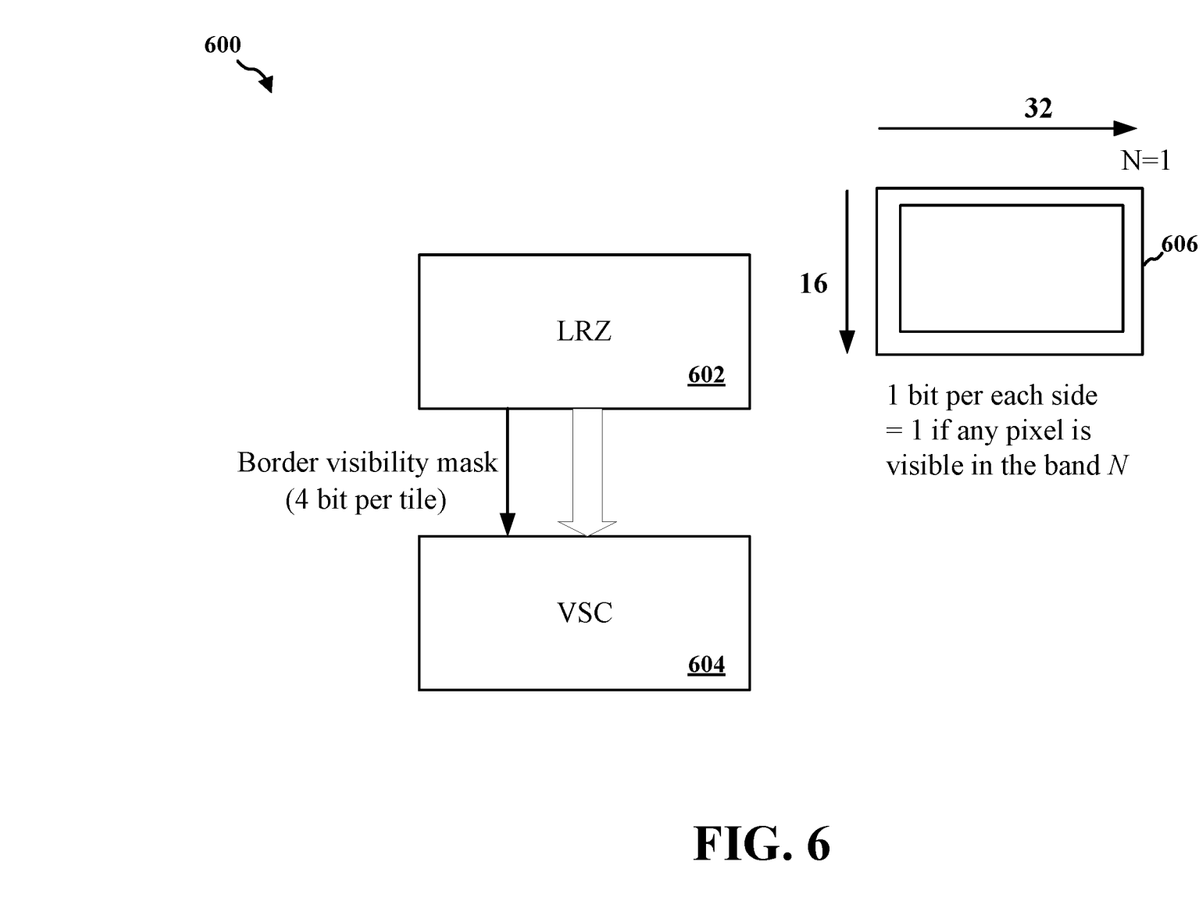
FIG. 6 illustrates a diagram for transmitting edge information for an expanded bin from a rasterizer to a visibility stream recorder in association with an apron visibility mask.

FIG. 6 illustrates a diagram 600 for transmitting edge information for an expanded bin 606 from a LRZ block 602 to a VSC block 604 in association with an apron visibility mask. In the expanded bin configuration, instead of checking intersections of the entire tile region (e.g., 32×16) with neighboring bins, the visibility hardware may check if the corresponding apron-bit (e.g., mask-bit) is set in the same direction. Such techniques may reduce the total number of visible tiles (and hence primitives) for the rendering pass to process.

If the expanded bin mode is enabled, visibility checks may be executed to determine tile-bin intersections for the expanded bin 606 based on a bin expansion algorithm. A first portion of the bin expansion algorithm may indicate a procedure for determining which edges of the pixel tile to designate as visible after pixel mask information is in the rasterizer. For example:

```
LRZ 602 may provide tile VSC 604 along with mask bits (4 bit per tile
- left, right, top, down)
   top = left = bottom = right = false; apron_size = reg_val(addr);
   //default is 16.
   for (i=0; i<32; i++) //for each 32x16 tile
   for (j=0; j<16; j++)
      if ((i < apron_size) && vis_mask[i][j]) left = true;
      else if (i > (32 – apron_size) && vis_mask[i][j]) right = true;
      if (j < apron_size && vis_mask[i][j]) top = true;
      else if (j > (16 – apron_size) && vis_mask[i][j]) bottom = true;
```

A second portion of the bin expansion algorithm may be associated with determinations of the visibility stream recorder regarding bins to be designated as visible for the pixel tile, based on the edge information. For example:

The following may be used for expanded bin:
   Original bin size (Bx,By)
   Tile size (Tx,Ty)
   Original pipe rectangle (Px0~Px1, Py0~Py1)
   Screen size (Sx,Sy)
   Determine which bins a tile corresponds to in (expanded) bin
      Assume top-left coordinate of tile is (x, y), use original algorithm for central bin (i, j).
         i=x/Bx; j=y/By
         Rx=x % Bx; Ry=y % By A third portion of the expansion algorithm may indicate to the VSC block 604 a procedure to be followed for designating tiles as visible, based on previously received information. After the edge information is provided to the visibility stream recorder/VSC block 604, adjacent tiles may be designated as visible for a given edge. For example:

```
Identify 3x3 bins centered at the bin as candidates
- Indices for nine bins may be: (i–1, i, i+1), (j–1, j, j+1)
- Check tile-bin-hit info from 3-bit vectors (Xi – 1, Xi, Xi +
   1), (Yj – 1, Yj,Yj +1), defined as
      (Xi – 1 = Rx == 0) && left // The left neighbor bin is
      covered
      Xi = 1 // The center bin is covered
      Xi + 1 = Rx + Tx == Bx && right // The right neighbor
      bin is covered
      (Yj – 1 = Ry == 0) && top // The top neighbor bin is
      covered
      Yj = 1 // The center bin is covered
      (Yj + 1 = Ry + Ty == By) && bottom // The bottom
      bin is covered
Check 3-bit vectors against screen size (Sx, Sy).
   Mark bit as 0, if bit exceeds screen boundary.
If Xm == 1|| Yn == 1, a bin (m, n) is valid for current tile.
Treat all valid bins as hit by the tile and record in visibility stream.
```

Bin expansion may be defined based on bits of a rasterizer input mask, which may depend on an apron size register value in the LRZ block 602. A default configuration may be the same size as one tile size. Logic of the hardware associated with the VSC block 604 may indicate the tiles to designate as visible in a sequential manner. That is, instead of the edge of the tiles/bins being identified one-by-one to determine whether each edge is visible based on the pixel tile/tile level information, the edges and/or corners of the tiles may be checked in parallel based on the edge information. The LRZ block 604 may transmit the edge information to the VSC block 604, which may determine the edges and tiles that are to be marked as visible based on the edge information.

The programmable apron may be utilized to increase hardware efficiencies in comparison to fixed tile-size aprons of applications with lower apron specifications based on reducing a workload for processing complex geometry. A single-cycle implementation of an intersection test may be provided based on a hardware block that performs the intersection test in expanded bin mode with minimal overhead. More specifically, the hardware may not need to check the intersections of a tile with the nine neighboring tiles, which may cause the intersection test to be performed up to six times faster. Accordingly, the binning time may be improved.

Figure 7:
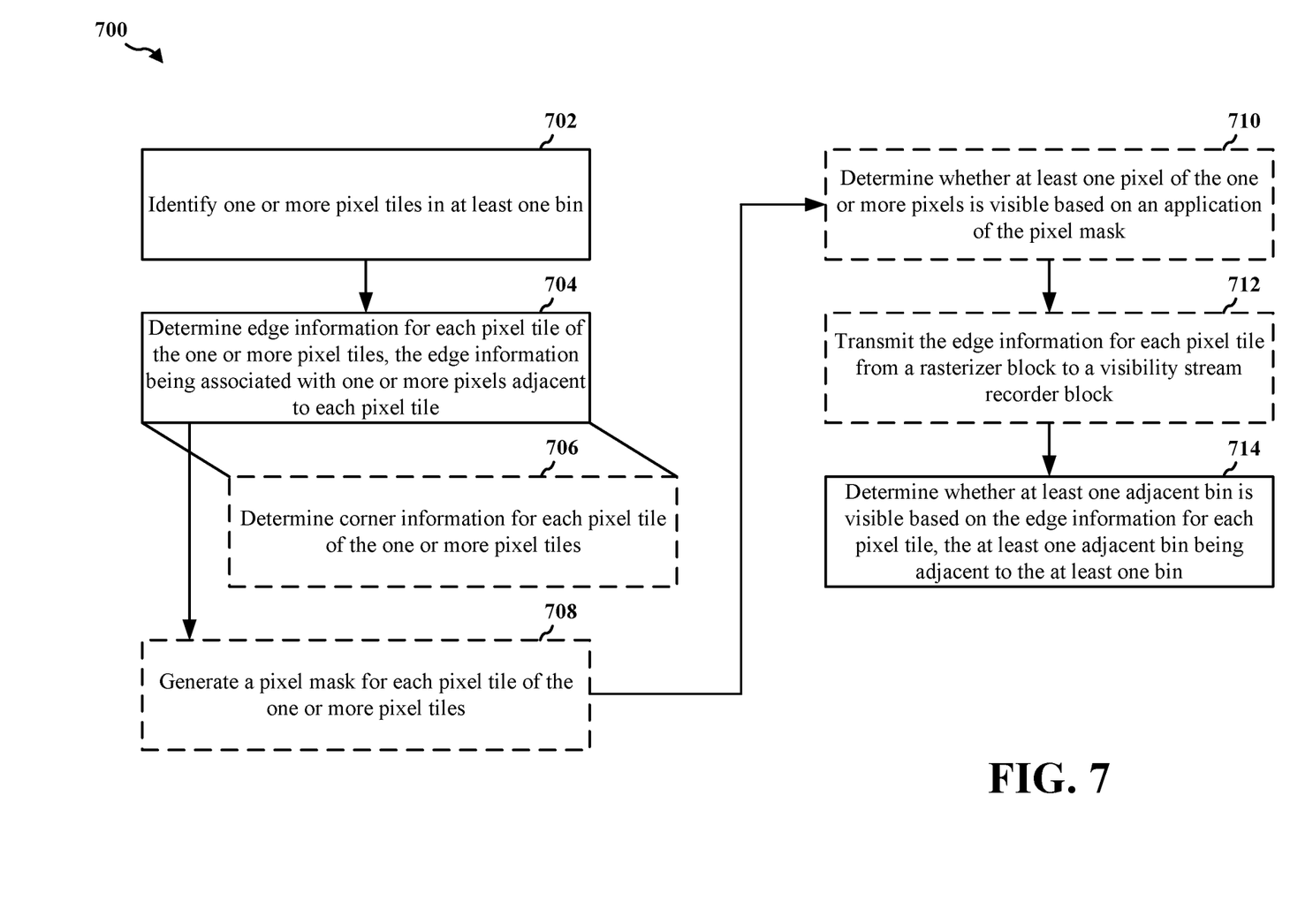
FIG. 7 illustrates an example flowchart of an example method in accordance with one or more techniques of this disclosure.

FIG. 7 illustrates a flowchart 700 of an example method in accordance with one or more techniques of this disclosure. The method may be performed by an apparatus such as a CPU, a GPU, or an apparatus for graphics processing.

At 702, the apparatus may identify one or more pixel tiles in at least one bin. For example, referring to FIG. 4, the apparatus may identify pixel tiles in the bin 402a. The one or more pixel tiles may include a plurality of pixels. In examples, the one or more pixels may be rasterized (e.g., via LRZ block 602).

At 704, the apparatus may determine edge information for each pixel tile of the one or more pixel tiles, the edge information being associated with one or more pixels adjacent to each pixel tile. For example, referring to FIG. 4, the apparatus may determine one or more edges of the bin 402a, where the one or more edges may be located along the apron 404 that includes pixels adjacent to the pixel tile/bin (e.g., pixels of the neighboring bin 402b). The edge information for at least some of the one or more pixel tiles may be determined in parallel. The one or more pixels may correspond to a block of N pixels wide by M pixels high, where N and M may be associated with a same value or a different value (e.g., the apron 404 may have uniform or non-uniform dimensions). A size of the one or more pixels (e.g., apron 404) may be programmable. For instance, the size of the one or more pixels (e.g., apron 404) may be at least one of 1 pixel, 2 pixels, 4 pixels, or 8 pixels.

At 706, for determining the edge information for each pixel tile of the one or more pixel tiles, the apparatus may further determine corner information for each pixel tile of the one or more pixel tiles. For example, referring to FIG. 4, the bin 402a include s a corner that borders three adjacent bins, including the neighboring bin 402b.

At 708, the apparatus may generate a pixel mask for each pixel tile of the one or more pixel tiles. For example, referring to FIG. 5, the diagram 500 includes a visibility mask applied to a 32×16 tile. The pixel mask may include one or more bits (e.g., the 4-bit mask of the diagram 500) that correspond to at least one of an upper apron region of the pixel tile, a lower apron region of the pixel tile, a left apron region of the pixel tile, or a right apron region of the pixel tile (e.g., as illustrated in the diagram 500). In examples, the one or more bits may be equal to four (4) bits that respectively correspond to the upper apron region of the pixel tile, the lower apron region of the pixel tile, the left apron region of the pixel tile, and the right apron region of the pixel tile (e.g., as illustrated in the diagram 500).

At 710, the apparatus may determine whether at least one pixel of the one or more pixels is visible based on an application of the pixel mask. For example, referring to FIG. 6, the diagram 600 indicates that a bit of the visibility mask may correspond to 1 if, based on application of the visibility mask, a pixel is visible in the band N (e.g., N=1).

At 712, the apparatus may transmit the edge information for each pixel tile from a rasterizer block to a visibility stream recorder block. For example, referring to FIG. 6, the LRZ block 602 may transmit a border visibility mask (e.g., 4 bits per tile) to the VSC block 604. The rasterizer block (e.g., LRZ block 602) may determine the edge information for each pixel tile. The visibility stream recorder (e.g., VSC block 604) may determine whether the at least one adjacent bin (e.g., neighboring bin 402b) is visible based on the edge information for each pixel tile (e.g., in association with the bin 402a).

At 714, the apparatus may determine whether at least one adjacent bin is visible based on the edge information for each pixel tile, the at least one adjacent bin being adjacent to the at least one bin. For example, referring to FIG. 4, the apparatus may determine whether the neighboring bin 402b is visible based on edge information associated with pixel tiles of the bin 402a, where the neighboring bin 402b is adjacent to the bin 402a.

In one configuration, a method or apparatus for graphics processing is provided. The apparatus may be a CPU, a GPU, or some other processor that can perform graphics processing. In one aspect, the apparatus may be the processing unit 120 within the device 104, or may be some other hardware within device 104 or another device. The apparatus may include means for identifying one or more pixel tiles in at least one bin; means for determining edge information for each pixel tile of the one or more pixel tiles, the edge information being associated with one or more pixels adjacent to each pixel tile; and means for determining whether at least one adjacent bin is visible based on the edge information for each pixel tile, the at least one adjacent bin being adjacent to the at least one bin. In examples, the means for determining the edge information for each pixel tile of the one or more pixel tiles may be further configured to determine corner information for each pixel tile of the one or more pixel tiles. The apparatus may further include means for generating a pixel mask for each pixel tile of the one or more pixel tiles. The apparatus may further include means for determining whether at least one pixel of the one or more pixels is visible based on an application of the pixel mask. The apparatus may further include means for transmitting the edge information for each pixel tile from a rasterizer block to a visibility stream recorder block.

The subject matter described herein can be implemented to realize one or more benefits or advantages. For instance, the described graphics processing techniques can be used by a GPU, a CPU, or some other processor that can perform graphics processing to implement a configurable apron for the expanded binning techniques described herein. This can also be accomplished at a low cost compared to other graphics processing techniques. Moreover, the graphics processing techniques herein can improve or speed up data processing or execution. Further, the graphics processing techniques herein can improve resource or data utilisation and/or resource efficiency. Additionally, aspects of the present disclosure can utilize ECAA techniques in order to lower storage conditions and/or reduce performance overhead.

In accordance with this disclosure, the term "or" may be interrupted as "and/or" where context does not dictate otherwise. Additionally, while phrases such as "one or more" or "at least one" or the like may have been used for some features disclosed herein but not others, the features for which such language was not used may be interpreted to have such a meaning implied where context does not dictate otherwise.

In one or more examples, the functions described herein may be implemented in hardware, software, firmware, or any combination thereof. For example, although the term "processing unit" has been used throughout this disclosure, such processing units may be implemented in hardware, software, firmware, or any combination thereof. If any function, processing unit, technique described herein, or other module is implemented in software, the function, processing unit, technique described herein, or other module may be stored on or transmitted over as one or more instructions or code on a computer-readable medium. Computer-readable media may include computer data storage media or communication media including any medium that facilitates transfer of a computer program from one place to another. In this manner, computer-readable media generally may correspond to (1) tangible computer-readable storage media, which is non-transitory or (2) a communication medium such as a signal or carrier wave. Data storage media may be any available media that can be accessed by one or more computers or one or more processors to retrieve instructions, code and/or data structures for implementation of the techniques described in this disclosure. By way of example, and not limitation, such computer-readable media can comprise RAM, ROM, EEPROM, CD-ROM or other optical disk storage, magnetic disk storage or other magnetic storage devices. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media. A computer program product may include a computer-readable medium.

The code may be executed by one or more processors, such as one or more digital signal processors (DSPs), general purpose microprocessors, application specific integrated circuits (ASICs), arithmetic logic units (ALUs), field programmable logic arrays (FPGAs), or other equivalent integrated or discrete logic circuitry. Accordingly, the term "processor," as used herein may refer to any of the foregoing structure or any other structure suitable for implementation of the techniques described herein. Also, the techniques could be fully implemented in one or more circuits or logic elements.

The techniques of this disclosure may be implemented in a wide variety of devices or apparatuses, including a wireless handset, an integrated circuit (IC) or a set of ICs, e.g., a chip set. Various components, modules or units are described in this disclosure to emphasize functional aspects of devices configured to perform the disclosed techniques, but do not necessarily need realization by different hardware units. Rather, as described above, various units may be combined in any hardware unit or provided by a collection of interoperative hardware units, including one or more processors as described above, in conjunction with suitable software and/or firmware.

Various examples have been described. These and other examples are within the scope of the following claims.

What is claimed is:

1. A method of graphics processing, comprising:
   identifying one or more pixel tiles in at least one bin;

determining edge information for each pixel tile of the one or more pixel tiles, the edge information being associated with one or more pixels adjacent to each pixel tile;

generating a pixel mask for each pixel tile of the one or more pixel tiles, wherein the pixel mask includes one or more bits that correspond to at least one of an upper apron region of the pixel tile, a lower apron region of the pixel tile, a left apron region of the pixel tile, or a right apron region of the pixel tile;

transmitting the edge information for each pixel tile from a rasterizer block to a visibility stream recorder block, wherein the rasterizer block is a hierarchical depth block and the visibility stream recorder block is associated with a visibility of the one or more pixel tiles; and determining whether at least one adjacent bin is visible based on the edge information for each pixel tile, the at least one adjacent bin being adjacent to the at least one bin.

2. The method of claim 1, further comprising determining whether at least one pixel of the one or more pixels is visible based on an application of the pixel mask.

3. The method of claim 1, wherein the one or more bits is equal to four (4) bits that respectively correspond to the upper apron region of the pixel tile, the lower apron region of the pixel tile, the left apron region of the pixel tile, and the right apron region of the pixel tile.

4. The method of claim 1, wherein the rasterizer block determines the edge information for each pixel tile.

5. The method of claim 1, wherein the visibility stream recorder block determines whether the at least one adjacent bin is visible based on the edge information for each pixel tile.

6. The method of claim 1, wherein the edge information for at least some of the one or more pixel tiles is determined in parallel.

7. The method of claim 1, wherein determining the edge information for each pixel tile of the one or more pixel tiles further comprises determining corner information for each pixel tile of the one or more pixel tiles.

8. The method of claim 1, wherein the one or more pixels correspond to a block of N pixels wide by M pixels high, where N and M are associated with a same value or a different value.

9. The method of claim 1, wherein a size of the one or more pixels is programmable.

10. The method of claim 9, wherein the size is at least one of 1 pixel, 2 pixels, 4 pixels, or 8 pixels.

11. The method of claim 1, wherein each of the one or more pixel tiles includes a plurality of pixels.

12. The method of claim 1, wherein the one or more pixel tiles are rasterized.

13. An apparatus for graphics processing, comprising:
a memory; and
at least one processor coupled to the memory and configured to:
identify one or more pixel tiles in at least one bin;
determine edge information for each pixel tile of the one or more pixel tiles, the edge information being associated with one or more pixels adjacent to each pixel tile;
generate a pixel mask for each pixel tile of the one or more pixel tiles, wherein the pixel mask includes one or more bits that correspond to at least one of an upper apron region of the pixel tile, a lower apron region of the pixel tile, a left apron region of the pixel tile, or a right apron region of the pixel tile;
transmit the edge information for each pixel tile from a rasterizer block to a visibility stream recorder block, wherein the rasterizer block is a hierarchical depth block and the visibility stream recorder block is associated with a visibility of the one or more pixel tiles; and
determine whether at least one adjacent bin is visible based on the edge information for each pixel tile, the at least one adjacent bin being adjacent to the at least one bin.

14. The apparatus of claim 13, wherein the at least one processor is further configured to determine whether at least one pixel of the one or more pixels is visible based on an application of the pixel mask.

15. The apparatus of claim 13, wherein the one or more bits is equal to four (4) bits that respectively correspond to the upper apron region of the pixel tile, the lower apron region of the pixel tile, the left apron region of the pixel tile, and the right apron region of the pixel tile.

16. The apparatus of claim 13, wherein the at least one processor is configured to determine the edge information for each pixel tile via the rasterizer block.

17. The apparatus of claim 13, wherein the at least one processor is configured to determine whether the at least one adjacent bin is visible based on the edge information for each pixel tile via the visibility stream recorder block.

18. The apparatus of claim 13, wherein the at least one processor is configured to determine the edge information for at least some of the one or more pixel tiles in parallel.

19. The apparatus of claim 13, wherein to determine the edge information for each pixel tile of the one or more pixel tiles the at least one processor is further configured to determine corner information for each pixel tile of the one or more pixel tiles.

20. The apparatus of claim 13, wherein the one or more pixels correspond to a block of N pixels wide by M pixels high, where N and M are associated with a same value or a different value.

21. The apparatus of claim 13, wherein a size of the one or more pixels is programmable.

22. The apparatus of claim 21, wherein the size is at least one of 1 pixel, 2 pixels, 4 pixels, or 8 pixels.

23. The apparatus of claim 13, wherein each of the one or more pixel tiles includes a plurality of pixels.

24. The apparatus of claim 13, wherein the one or more pixel tiles are rasterized.

25. An apparatus for graphics processing, comprising:
means for identifying one or more pixel tiles in at least one bin;
means for determining edge information for each pixel tile of the one or more pixel tiles, the edge information being associated with one or more pixels adjacent to each pixel tile;
means for generating a pixel mask for each pixel tile of the one or more pixel tiles, wherein the pixel mask includes one or more bits that correspond to at least one of an upper apron region of the pixel tile, a lower apron region of the pixel tile, a left apron region of the pixel tile, or a right apron region of the pixel tile;
means for transmitting the edge information for each pixel tile from a rasterizer block to a visibility stream recorder block, wherein the rasterizer block is a hierarchical depth block and the visibility stream recorder block is associated with a visibility of the one or more pixel tiles; and means for determining whether at least one adjacent bin is visible based on the edge information for each pixel tile, the at least one adjacent bin being adjacent to the at least one bin.

26. The apparatus of claim 25, further comprising means for determining whether at least one pixel of the one or more pixels is visible based on an application of the pixel mask.

27. The apparatus of claim 25, wherein the one or more bits is equal to four (4) bits that respectively correspond to the upper apron region of the pixel tile, the lower apron region of the pixel tile, the left apron region of the pixel tile, and the right apron region of the pixel tile.

28. The apparatus of claim 25, wherein the rasterizer block determines the edge information for each pixel tile.

29. The apparatus of claim 25, wherein the visibility stream recorder block determines whether the at least one adjacent bin is visible based on the edge information for each pixel tile.

30. The apparatus of claim 25, wherein the edge information for at least some of the one or more pixel tiles is determined in parallel.

31. The apparatus of claim 25, wherein the means for determining the edge information for each pixel tile of the one or more pixel tiles is further configured to determine corner information for each pixel tile of the one or more pixel tiles.

32. The apparatus of claim 25, wherein the one or more pixels correspond to a block of N pixels wide by M pixels high, where N and M are associated with a same value or a different value.

33. The apparatus of claim 25, wherein a size of the one or more pixels is programmable.

34. The apparatus of claim 33, wherein the size is at least one of 1 pixel, 2 pixels, 4 pixels, or 8 pixels.

35. The apparatus of claim 25, wherein each of the one or more pixel tiles includes a plurality of pixels.

36. The apparatus of claim 25, wherein the one or more pixel tiles are rasterized.

37. A non-transitory computer-readable medium storing computer executable code for graphics processing, the code when executed by a processor causes the processor to:
  identify one or more pixel tiles in at least one bin;
  determine edge information for each pixel tile of the one or more pixel tiles, the edge information being associated with one or more pixels adjacent to each pixel tile;
  generate a pixel mask for each pixel tile of the one or more pixel tiles, wherein the pixel mask includes one or more bits that correspond to at least one of an upper apron region of the pixel tile, a lower apron region of the pixel tile, a left apron region of the pixel tile, or a right apron region of the pixel tile;
  transmit the edge information for each pixel tile from a rasterizer block to a visibility stream recorder block, wherein the rasterizer block is a hierarchical depth block and the visibility stream recorder block is associated with a visibility of the one or more pixel tiles; and
  determine whether at least one adjacent bin is visible based on the edge information for each pixel tile, the at least one adjacent bin being adjacent to the at least one bin.

* * * * *